(12) United States Patent
Cho et al.

(10) Patent No.: US 12,184,686 B2
(45) Date of Patent: Dec. 31, 2024

(54) IOT DEVICE INSPECTION METHOD, AND DEVICE THEREFOR

(71) Applicant: ZIEN, INC., Seoul (KR)

(72) Inventors: Young Min Cho, Incheon (KR); Min Kyeong Son, Seoul (KR); Min Soo Eun, Seoul (KR)

(73) Assignee: ZIEN, INC., Seoul (KR)

( * ) Notice: Subject to any disclaimer, the term of this patent is extended or adjusted under 35 U.S.C. 154(b) by 0 days.

(21) Appl. No.: 18/647,831

(22) Filed: Apr. 26, 2024

(65) Prior Publication Data

US 2024/0297895 A1  Sep. 5, 2024

Related U.S. Application Data

(63) Continuation of application No. PCT/KR2022/016692, filed on Oct. 28, 2022.

(30) Foreign Application Priority Data

Nov. 1, 2021 (KR) .................. 10-2021-0148131

(51) Int. Cl.
*H04L 9/40* (2022.01)
*G06F 21/55* (2013.01)
(Continued)

(52) U.S. Cl.
CPC ........ *H04L 63/1433* (2013.01); *H04L 63/029* (2013.01); *H04L 63/1425* (2013.01); *G16Y 30/10* (2020.01)

(58) Field of Classification Search
CPC .............. H04L 63/1433; H04L 63/029; H04L 63/1425; H04L 63/20; G16Y 30/10; G06F 21/577; G06F 2212/175
See application file for complete search history.

(56) References Cited

U.S. PATENT DOCUMENTS 11,042,635 B2 * 6/2021 Sella ................. G06F 21/554
11,374,842 B1 * 6/2022 Singh ................ G06F 11/3636
(Continued)

FOREIGN PATENT DOCUMENTS

KR  20170056876 A  5/2017
KR  20190067355 A  6/2019
(Continued)

OTHER PUBLICATIONS

Fang et al., "IOTA: A Framework for Analyzing System-Level Security of IoTs," 2022 IEEE/ACM Seventh International Conference on Internet-of-Things Design and Implementation (IoTDI) Year: 2022 | Conference Paper | Publisher: IEEE.*
(Continued)

*Primary Examiner* — Roderick Tolentino
(74) *Attorney, Agent, or Firm* — Guntin & Gust, PLC; Miyoung Shin

(57) ABSTRACT

Aspects of the subject disclosure may include, for example, an IoT device inspection method, and a device therefor. An analysis server transmits an information collection module to an IoT device, collects state information about the IoT device through the information collection module, and searches, on the basis of the state information, for a database including information related to weaknesses, so as to analyze weaknesses of the IoT device. Other embodiments are disclosed.

7 Claims, 16 Drawing Sheets

(51) Int. Cl.
    *G06F 21/56*     (2013.01)
    *G16Y 30/10*     (2020.01)

(56) References Cited

U.S. PATENT DOCUMENTS

| | | | | |
|---|---|---|---|---|
| 2016/0092679 | A1* | 3/2016 | Kim | G06F 21/552 |
| | | | | 726/25 |
| 2017/0091455 | A1* | 3/2017 | Levchenko | G06F 21/6218 |
| 2020/0052908 | A1* | 2/2020 | Thitron | H04L 63/20 |
| 2020/0201987 | A1* | 6/2020 | Kanemoto | G06F 21/55 |
| 2022/0053011 | A1* | 2/2022 | Rao | G06F 21/577 |
| 2022/0329630 | A1* | 10/2022 | Li | G06F 21/577 |
| 2023/0018096 | A1* | 1/2023 | Ueda | H04L 63/145 |
| 2023/0071264 | A1* | 3/2023 | Hakala | H04L 63/20 |

FOREIGN PATENT DOCUMENTS

| | | |
|---|---|---|
| KR | 20190067542 A | 6/2019 |
| KR | 20200092508 A | 8/2020 |
| KR | 20210059991 A | 5/2021 |
| KR | 20210091953 A | 7/2021 |
| KR | 102454948 B1 | 10/2022 |

OTHER PUBLICATIONS

Fang et al., "IOTA: A Framework for Analyzing System-Level Security of IoTs," 2022 IEEE/ACM Seventh International Conference on Internet-of-Things Design and Implementation (IoTDI) Year: 2022 | Conference Paper | Publisher: IEEE.*
Shokeen et al., "Vulnerabilities Analysis and Security Assessment Framework for the Internet of Things," 2019 Cybersecurity and Cyberforensics Conference (CCC) Year: 2019 | Conference Paper | Publisher: IEEE.*
"Notice of Allowance for corresponding Korean Application No. 10-2021-0148131", Oct. 10, 2022, 5 pages.
"Office Action for corresponding Korean Application No. 10-2021-0148131", Sep. 6, 2022, 5 pages.
"PCT International Search Report for corresponding Korean Application No. PCT/KR2022/016692", 4 pages.
"Preliminary Examination Result for corresponding Korean Application No. 10-2021-0148131", Mar. 4, 2022, 4 pages.

* cited by examiner

FIG. 4

Linux zn-iot 5.11.0-34-generic #36~20.04.1-Ubuntu SMP Fri Aug 27 08:06:32 UTC 2021 x86_64 x86_64 x86_64 GNU/Linux
zn@zn-iot:~$

FIG.5

| UID | PID | PPID | C | STIME | TTY | TIME | CMD |
|---|---|---|---|---|---|---|---|
| root | 1 | 0 | 0 | 9am 15 | ? | 00:00:14 | /sbin/init splash |
| root | 2 | 0 | 0 | 9am 15 | ? | 00:00:00 | [kthreadd] |
| root | 3 | 2 | 0 | 9am 15 | ? | 00:00:00 | [rcu_gp] |
| root | 4 | 2 | 0 | 9am 15 | ? | 00:00:00 | [rcu_par_gp] |
| root | 6 | 2 | 0 | 9am 15 | ? | 00:00:00 | [kworker/0:0H-events_highpri] |
| root | 9 | 2 | 0 | 9am 15 | ? | 00:00:00 | [mm_percpu_wq] |
| root | 10 | 2 | 0 | 9am 15 | ? | 00:00:00 | [rcu_tasks_rude_] |
| root | 11 | 2 | 0 | 9am 15 | ? | 00:00:00 | [rcu_tasks_trace] |
| root | 12 | 2 | 0 | 9am 15 | ? | 00:00:04 | [ksoftirqd/0] |
| root | 13 | 2 | 0 | 9am 15 | ? | 00:10:19 | [rcu_sched] |
| root | 14 | 2 | 0 | 9am 15 | ? | 00:00:02 | [migration/0] |
| root | 15 | 2 | 0 | 9am 15 | ? | 00:00:00 | [idle_inject/0] |
| root | 16 | 2 | 0 | 9am 15 | ? | 00:00:00 | [cpuhp/0] |
| root | 17 | 2 | 0 | 9am 15 | ? | 00:00:00 | [cpuhp/1] |
| root | 18 | 2 | 0 | 9am 15 | ? | 00:00:00 | [idle_inject/1] |
| root | 19 | 2 | 0 | 9am 15 | ? | 00:00:02 | [migration/1] |
| root | 20 | 2 | 0 | 9am 15 | ? | 00:00:02 | [ksoftirqd/1] |
| root | 22 | 2 | 0 | 9am 15 | ? | 00:00:00 | [kworker/1:0H-events_highpri] |
| root | 23 | 2 | 0 | 9am 15 | ? | 00:00:00 | [cpuhp/2] |
| root | 24 | 2 | 0 | 9am 15 | ? | 00:00:00 | [idle_inject/2] |
| root | 25 | 2 | 0 | 9am 15 | ? | 00:00:02 | [migration/2] |
| root | 26 | 2 | 0 | 9am 15 | ? | 00:00:02 | [ksoftirqd/2] |
| root | 28 | 2 | 0 | 9am 15 | ? | 00:00:00 | [kworker/2:0H-events_highpri] |
| root | 29 | 2 | 0 | 9am 15 | ? | 00:00:00 | [cpuhp/3] |
| root | 30 | 2 | 0 | 9am 15 | ? | 00:00:00 | [idle_inject/3] |

FIG. 6

```
Chain INPUT (policy ACCEPT)
target     prot opt source               destination Chain FORWARD (policy DROP)
target     prot opt source               destination
DOCKER-USER  all  --  anywhere            anywhere
DOCKER-ISOLATION-STAGE-1  all  --  anywhere  anywhere
ACCEPT     all  --  anywhere             anywhere             ctstate RELATED,ESTABLISHED
DOCKER     all  --  anywhere             anywhere
ACCEPT     all  --  anywhere             anywhere
ACCEPT     all  --  anywhere             anywhere
ACCEPT     all  --  anywhere             anywhere             ctstate RELATED,ESTABLISHED
DOCKER     all  --  anywhere             anywhere
ACCEPT     all  --  anywhere             anywhere
ACCEPT     all  --  anywhere             anywhere
ACCEPT     all  --  anywhere             anywhere             ctstate RELATED,ESTABLISHED
DOCKER     all  --  anywhere             anywhere
ACCEPT     all  --  anywhere             anywhere
ACCEPT     all  --  anywhere             anywhere
ACCEPT     all  --  anywhere             anywhere             ctstate RELATED,ESTABLISHED
DOCKER     all  --  anywhere             anywhere
ACCEPT     all  --  anywhere             anywhere
ACCEPT     all  --  anywhere             anywhere Chain OUTPUT (policy ACCEPT)
target     prot opt source               destination
```

FIG. 7

```
docker0: flags=4163<UP,BROADCAST,RUNNING,MULTICAST>  mtu 1500
        inet 172.17.0.1  netmask 255.255.0.0  broadcast 172.17.255.255
        inet6 fe80::42:1fff:fe0a:e682  prefixlen 64  scopeid 0x20<link>
        ether 02:42:1f:0a:e6:82  txqueuelen 0  (Ethernet)
        RX packets 1027689  bytes 3738663551 (3.7 GB)
        RX errors 0  dropped 0  overruns 0  frame 0
        TX packets 885005  bytes 96609592 (96.6 MB)
        TX errors 0  dropped 0  overruns 0  carrier 0  collisions 0 enp5s0: flags=4163<UP,BROADCAST,RUNNING,MULTICAST>  mtu 1500
        inet 192.168.0.239  netmask 255.255.255.0  broadcast 192.168.0.255
        inet6 fe80::8374:ce2e:fe5e:a296  prefixlen 64  scopeid 0x20<link>
        ether f0:2f:74:db:d2:a9  txqueuelen 1000  (Ethernet)
        RX packets 9592434  bytes 1387425342 (1.3 GB)
        RX errors 0  dropped 3  overruns 0  frame 0
        TX packets 3241710  bytes 4108492812 (4.1 GB)
        TX errors 0  dropped 0  overruns 0  carrier 0  collisions 0
        device memory 0xfc400000-fc4fffff
```

FIG. 8

| Proto | Recv-Q | Send-Q | Local Address | Foreign Address | State | PID/Program name |
|---|---|---|---|---|---|---|
| tcp | 0 | 0 | 0.0.0.0:22222 | 0.0.0.0:* | LISTEN | 484261/docker-proxy |
| tcp | 0 | 0 | 0.0.0.0:9999 | 0.0.0.0:* | LISTEN | 479655/python |
| tcp | 0 | 0 | 0.0.0.0:8080 | 0.0.0.0:* | LISTEN | 4788/node |
| tcp | 0 | 0 | 127.0.0.53:53 | 0.0.0.0:* | LISTEN | 738/systemd-resolve |
| tcp | 0 | 0 | 0.0.0.0:22 | 0.0.0.0:* | LISTEN | 891/sshd: /usr/sbin |
| tcp | 0 | 0 | 127.0.0.1:631 | 0.0.0.0:* | LISTEN | 833985/cupsd |
| tcp | 0 | 0 | 0.0.0.0:5432 | 0.0.0.0:* | LISTEN | 2728/docker-proxy |
| tcp | 0 | 0 | 127.0.0.1:34553 | 0.0.0.0:* | LISTEN | 914/containerd |
| tcp | 0 | 0 | 0.0.0.0:443 | 0.0.0.0:* | LISTEN | 2754/docker-proxy |
| tcp | 0 | 0 | 0.0.0.0:20001 | 0.0.0.0:* | LISTEN | 479229/docker-proxy |
| tcp | 0 | 0 | 172.20.0.1:36964 | 172.20.0.2:5432 | TIME_WAIT | - |
| tcp | 0 | 0 | 172.20.0.1:36984 | 172.20.0.2:5432 | TIME_WAIT | - |
| tcp | 0 | 0 | 127.0.0.1:35852 | 127.0.0.1:5432 | TIME_WAIT | - |
| tcp | 0 | 0 | 127.0.0.1:36076 | 127.0.0.1:5432 | TIME_WAIT | - |
| tcp | 0 | 0 | 172.20.0.1:37148 | 172.20.0.2:5432 | TIME_WAIT | - |
| tcp | 0 | 0 | 127.0.0.1:35868 | 127.0.0.1:5432 | TIME_WAIT | - |
| tcp | 0 | 0 | 127.0.0.1:35776 | 127.0.0.1:5432 | TIME_WAIT | - |
| tcp | 0 | 0 | 172.20.0.1:37084 | 172.20.0.2:5432 | TIME_WAIT | - |

FIG. 9

```
root:x:0:0:root:/root:/bin/bash
daemon:x:1:1:daemon:/usr/sbin:/usr/sbin/nologin
bin:x:2:2:bin:/bin:/usr/sbin/nologin
sys:x:3:3:sys:/dev:/usr/sbin/nologin
sync:x:4:65534:sync:/bin:/bin/sync
games:x:5:60:games:/usr/games:/usr/sbin/nologin
man:x:6:12:man:/var/cache/man:/usr/sbin/nologin
lp:x:7:7:lp:/var/spool/lpd:/usr/sbin/nologin
mail:x:8:8:mail:/var/mail:/usr/sbin/nologin
news:x:9:9:news:/var/spool/news:/usr/sbin/nologin
uucp:x:10:10:uucp:/var/spool/uucp:/usr/sbin/nologin
proxy:x:13:13:proxy:/bin:/usr/sbin/nologin
www-data:x:33:33:www-data:/var/www:/usr/sbin/nologin
backup:x:34:34:backup:/var/backups:/usr/sbin/nologin
list:x:38:38:Mailing List Manager:/var/list:/usr/sbin/nologin
irc:x:39:39:ircd:/var/run/ircd:/usr/sbin/nologin
gnats:x:41:41:Gnats Bug-Reporting System (admin):/var/lib/gnats:/usr/sbin/nologin
nobody:x:65534:65534:nobody:/nonexistent:/usr/sbin/nologin
systemd-network:x:100:102:systemd Network Management,,,:/run/systemd:/usr/sbin/nologin
systemd-resolve:x:101:103:systemd Resolver,,,:/run/systemd:/usr/sbin/nologin
systemd-timesync:x:102:104:systemd Time Synchronization,,,:/run/systemd:/usr/sbin/nologin
messagebus:x:103:106::/nonexistent:/usr/sbin/nologin
syslog:x:104:110::/home/syslog:/usr/sbin/nologin
```

*FIG. 10*

```
□ 29/09/2021  ⊙ 09:50.55  🏠 /home/mobaxterm/.ssh  ls
id_rsa           id_rsa.pub       known_hosts □ 29/09/2021  ⊙ 09:50.56  🏠 /home/mobaxterm/.ssh  cat id_rsa
-----BEGIN RSA PRIVATE KEY-----
MIIEpAIBAAKCAQEAvxChByLrKp9QX36zQiLahWfHFM5NEBb9+BhvaGewRdvR6/Dp
jmu7ZzYjb8kaYRHEOxXROwnIoFuGdIjum6AFna6sHPj3bnq3wt8wD4//swt3SNPY
hj+2Zua/n7gzY8EyZdTm876efseZMtod/qsU3fDQuOGtxz4NKOIRI/YiLk36Lz0M
UY8BKzanJOXFwtAvxe9Pv69aHMiw44b5wI+E87Uxt6GFwr4mxMHYWMXQS6Hci8t8
3bH7myce4C6FguXAibozpnOqScL4h/eMyp3q3ZQEuXEypdAikRGrwu1BRp4iAdHy
ZNRYiwAfqi2igoxt9RI2xmx7iTTOi8ve/nJudwIDAQABAoIBAEXj6lN29XkY38ie
yynFIBQumwdEU7IwBuTK423YfoK9Xzokyi1TXkds1+kS4zLp3skuok008t3PZJvzV
fWpwBdfhPjo25C04pfuKqsT2kri1G03KDc69H00whojVNpxa1ZB8V2wmMT73bc3HD
kbdHkSF/9mOvueapDxiGXKi/73Rc8bBkY6KgoEmOLdU98MZGqLnX+8rlB2pIQXMa
SoppLw3Aw8nmSkesVCjffCfhxwo/+iy8s4K4PZgLEnfu/CdKTZNnZzfiVBIQ4JbC
hm2/4K017Y7vfwimT7G/uFlP+tniFHRDT7oR1+6TI9Sx264aKK+OhVRrmNDjRKno
```

FIG. 11

```
📁 29/09/2021  🕘 09:53.30  💾 /bin  ls
MoTTY.exe            cygtermd.exe              libxcb-glx-0.dll
MobaCompareFiles     cygwin-console-helper.exe libxcb-image-0.dll
MobaCompareFolders   cygwin1.dll               libxcb-shm-0.dll
MobaGitEditor        cygxcb-1.dll              libxcb-util-1.dll
MobaListPorts        cygz.dll                  ls
MobaPictureViewer    default.xkm               lscolors
MobaTextEditor       dwm_w32.exe               lsfont
OpenX.exe            grep.exe                  lsz.exe
XWin_MobaX.exe       jwm.exe                   protocol.txt
 ssh.exe             libGL-1.dll               scrdaemons
bash.exe             libICE-6.dll              setxkbmap.exe
busybox.exe          libSM-6.dll               sh
cat                  libX11-6.dll              ssh-keygen.exe
cygX11-6.dll         libX11-xcb-1.dll          ssh.exe
cygXau-6.dll         libXau-6.dll              swrast_dri.so
cygXdmcp-6.dll       libXdmcp-6.dll            twm_w32.exe
cygXext-6.dll        libXext-6.dll             xauth.exe
cygXmuu-1.dll        libXfont-1.dll            xhost.exe
cygcom_err-2.dll     libXmu-6.dll              xkbcomp_w32.exe
```

FIG. 12

```
Xorg.0.log            auth.log.1      boot.log.7       dmesg.3.gz       installer                  syslog
Xorg.0.log.old        auth.log.2.gz   bootstrap.log    dmesg.4.gz       journal                    syslog.1
Xorg.1.log            auth.log.3.gz   btmp             dpkg.log         kern.log                   syslog.2.gz
Xorg.1.log.old        auth.log.4.gz   btmp.1           dpkg.log.1       kern.log.1                 syslog.3.gz
alternatives.log      boot.log        clamav           dpkg.log.2.gz    kern.log.2.gz              syslog.4.gz
alternatives.log.1    boot.log.1      cups             faillog          kern.log.3.gz              syslog.5.gz
alternatives.log.2.gz boot.log.2      dist-upgrade     fontconfig.log   kern.log.4.gz              syslog.6.gz
apport.log            boot.log.3      dmesg            gdm3             lastlog                    syslog.7.gz
apport.log.1          boot.log.4      dmesg.0          gpu-manager-switch.log  openvpn             ubuntu-advantage.log
apt                   boot.log.5      dmesg.1.gz       gpu-manager.log  private                    unattended-upgrades
auth.log              boot.log.6      dmesg.2.gz       hp               speech-dispatcher          wtmp
```

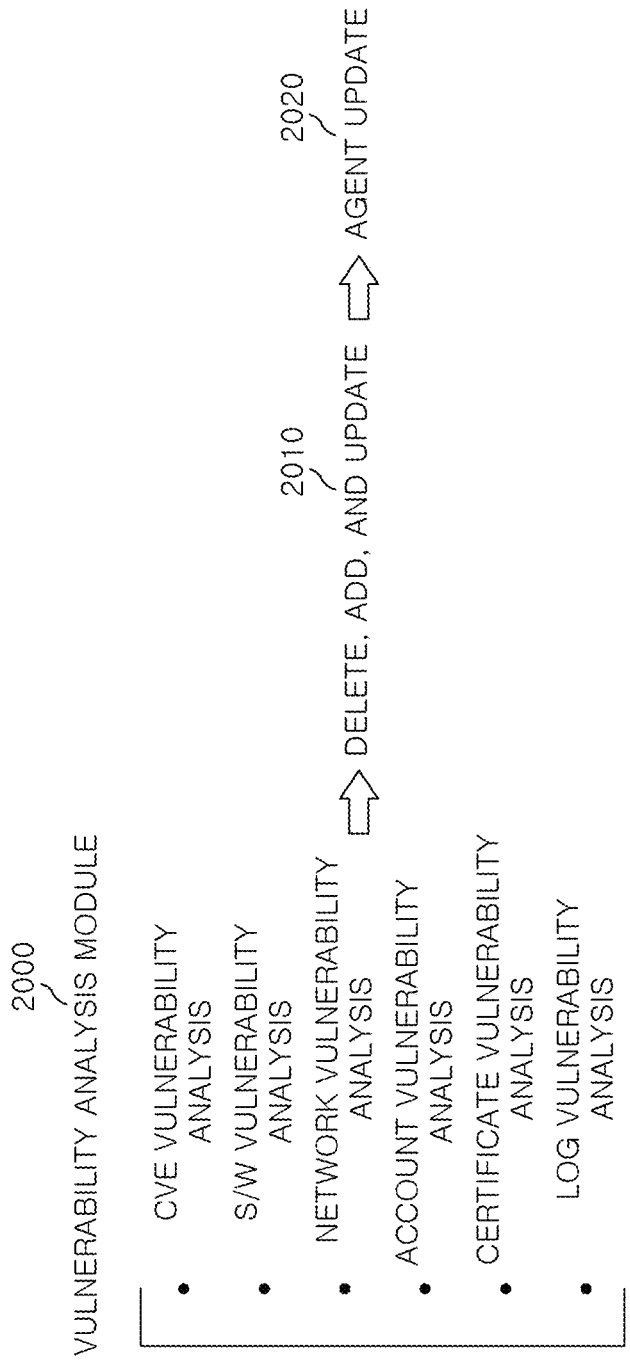

IOT DEVICE INSPECTION METHOD, AND DEVICE THEREFOR

CROSS-REFERENCE TO RELATED APPLICATION(S)

The present application is a continuation of, and claims priority to, PCT Patent Application No. PCT/KR2022/016692 filed Oct. 28, 2022, which claims priority to Korean Patent Application No. 10-2021-148131 filed on Nov. 1, 2021, the disclosures of which are hereby incorporated herein by reference in their entirety.

FIELD OF THE DISCLOSURE

Embodiments of the present disclosure are directed to providing a method and device for inspecting an Internet of things (IoT) device in order to comprehensively analyze and identify various vulnerabilities of IoT devices.

BACKGROUND

The Internet of things (IoT) refers to an environment in which data can be transmitted or received between objects over the Internet, and IoT devices are devices that can provide IoT services. IoT devices are widely used in various fields such as smart cities, smart homes, and the like. Because IoT devices transmit or receive data over the Internet, the IoT devices are at risk of being exposed to hacking by malicious third parties. IoT device manufacturers and users must be able to know what vulnerabilities the IoT devices they are manufacturing or using have in order to respond accordingly. However, there are limitations in determining various vulnerabilities individually.

SUMMARY

Embodiments of the present disclosure are directed to providing a method and device for inspecting an Internet of things (IoT) device that can comprehensively analyze and provide various vulnerabilities of IoT devices.

One aspect of the present disclosure provides an example of a method of inspecting an IoT device that includes: transmitting an information collection module to an IoT device; collecting status information of the IoT device through the information collection module; and searching a database including information on vulnerabilities on the basis of the status information and analyzing vulnerabilities of the IoT device.

A method of inspecting an Internet of things (IoT) device, comprising: connecting with a plurality of IoT devices, wherein software architecture information or hardware architecture information of the IoT device is obtained in the connection process; transmitting an information collection module to each IoT device, respectively, wherein the transmitted information collection module corresponds to the software architecture or the hardware architecture of the connected IoT device; collecting status information of the IoT device through the information collection module; and searching a database including information related to vulnerabilities based on the status information through a vulnerability analysis module to analyze vulnerabilities of the IoT device, and modifying the information collection module that is a smaller program compared to the vulnerability analysis module to change the type of information collected by the information collection module for each architecture if a new vulnerability analysis is needed or if the pre-implemented vulnerability analysis that can be performed is deleted or changed.

The database includes a second database including a list of malicious Internet addresses for blocking connection between the IoT device and the corresponding internet address or types of network interfaces unnecessary for the IoT device The collecting status information of the IoT device includes the collecting of the status information of firewall setting information set in the IoT device or connection information on a network connected to the IoT device.

The analyzing of the vulnerabilities of the IoT device includes searching the second database based on the firewall setting information or the network connection information to check whether the list of blocked internet addresses included in the firewall setting information includes malicious internet addresses already stored in the second database and identifying vulnerabilities in the network connection, including the possibility of connection to a malicious Internet address, based on whether the firewall setting information includes a malicious internet address already stored in the second database, or identifying vulnerabilities in the network connection of the IoT devices, or when network connection information is collected, searching for the type of unnecessary network interface in the database based on the collected network connection information to identify the type of unnecessary network interface among the network interfaces existing in the IoT device.

Another aspect of the present disclosure provides an example of a system for inspecting an IoT device that includes: a database including information on vulnerabilities; and an analysis server configured to transmit an information collection module to an IoT device, collect status information of the IoT device through the information collection module, and search the database including the information on the vulnerabilities on the basis of the status information to analyze vulnerabilities of the IoT device.

In one embodiment, a system for inspecting an Internet of things (IoT) device, comprising: a database including information on vulnerabilities, wherein the database includes a second database including a list of malicious Internet addresses for blocking connection between the IoT device and the corresponding internet address or types of network interfaces unnecessary for the IoT device; and an analysis server configured to connect with a plurality of IoT devices, wherein software architecture information or hardware architecture information of the IoT device is obtained in the connection process, transmit an information collection module to each IoT device, respectively, wherein the transmitted information collection module corresponds to the software architecture or the hardware architecture of the connected IoT device, collect status information of the IoT device through the information collection module, and search the database including the information on the vulnerabilities on the basis of the status information to analyze vulnerabilities of the IoT device, and modify the information collection module that is a smaller program compared to the vulnerability analysis module to change the type of information collected by the information collection module for each architecture if a new vulnerability analysis is needed or if the pre-implemented vulnerability analysis that can be performed is deleted or changed.

The analysis server, for collecting status information of the IoT device through the information collection module, is configured to collect of the status information of firewall setting information set in the IoT device or connection information on a network connected to the IoT device.

The analysis server, for analyzing of the vulnerability of the IoT device, is configured to search the second database based on the firewall setting information or the network connection information to check whether the list of blocked internet addresses included in the firewall setting information includes malicious internet addresses already stored in the second database and identifying vulnerabilities in the network connection, including the possibility of connection to a malicious Internet address, based on whether the firewall setting information includes a malicious internet address already stored in the second database, identify vulnerabilities in the network connection of the IoT devices, or search for the type of unnecessary network interface in the database based on the collected network connection information to identify the type of unnecessary network interface among the network interfaces existing in the IoT device when network connection information is collected.

According to embodiments of the present disclosure, the vulnerabilities of Internet of things (IoT) devices can be analyzed and provided from various perspectives, including an operating system (OS), software, a network, authentication, etc. The type of vulnerability analysis can be easily updated, deleted, or added, and thus the embodiments of the present disclosure can be applied to inspection of various types of IoT devices. Further, IoT devices with architectures such as different operating systems or the like can be inspected.

BRIEF DESCRIPTION OF THE DRAWINGS

Reference will now be made to the accompanying drawings, which are not necessarily drawn to scale, and wherein:

FIG. 4-12 are diagrams showing examples of status information collected by an information collection module from an IoT device implemented with a Linux operating system, where:

FIG. 4 shows information identified by the information collection module;

FIG. 5 shows a list of processes running on the IoT device identified by the information collection module;

FIG. 6 shows firewall setting information of the IoT device identified by the information collection module;

FIG. 7 shows network connection information identified by the information collection module;

FIG. 8 shows service information of a port in use identified by the information collection module;

FIG. 9 shows contents of the passwd and shadow files in a predefined directory collected by the information collection module;

FIG. 10 shows a Secure Shell Protocol (SSH) key, Secures Sockets Layer (SSL) certificate identified by the information collection module;

FIG. 11 shows a list of software or libraries stored in a corresponding directory; and FIG. 12 shows log files stored in a specific directory.

FIG. 14 is a diagram showing an example of a CVE vulnerability analysis method according to an embodiment of the present disclosure;

FIG. 15 is a diagram showing an example of a software vulnerability analysis method according to an embodiment of the present disclosure;

FIG. 16 is a diagram showing an example of a network vulnerability analysis method according to an embodiment of the present disclosure;

FIG. 17 is a diagram showing an example of an account vulnerability analysis method according to an embodiment of the present disclosure;

FIG. 18 is a diagram showing an example of a certificate vulnerability analysis method according to an embodiment of the present disclosure; and FIG. 19 is a diagram showing an example of a log vulnerability analysis method according to an embodiment of the present disclosure.

FIG. 20 is a diagram showing an example of a method of changing the type of vulnerability analysis according to an embodiment of the present disclosure.

DETAILED DESCRIPTION

Hereinafter, a method and device for inspecting an Internet of things (IoT) device according to embodiments of the present disclosure will be described in detail with reference to the accompanying drawings.

Figure 1:
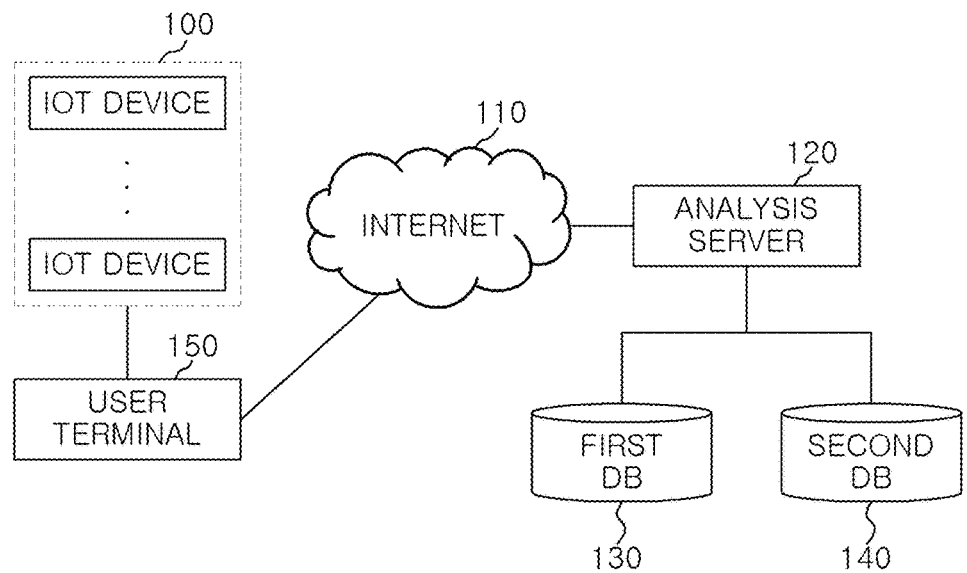
FIG. 1 is a diagram illustrating an example of a schematic structure of an overall system for inspecting Internet of things (IoT) devices according to an embodiment of the present disclosure.

FIG. 1 is a diagram illustrating an example of a schematic structure of an overall system for inspecting IoT devices according to an embodiment of the present disclosure.

Referring to FIG. 1, the system for inspecting an IoT device includes an analysis server 120 and one or more databases 130 and 140. The analysis server 120 may be connected to a user terminal 150 through an Internet 110. IoT devices 100 may receive an information collection module that will be described below from the user terminal 150. As another embodiment, the IoT devices 100 may be connected to the analysis server 120 through the Internet 110, and in this case, the IoT devices 100 may receive the information collection module directly from the analysis server.

The IoT devices 100 may include various types of operating systems (e.g., Linux and the like). Further, hardware such as a processor and the like present in the IoT device 100 may be configured in various ways. That is, the software and/or hardware architecture of the IoT devices 100 may be different from each other, but the present embodiment is not limited to a specific type of architecture and presents a method of inspecting all IoT devices implemented with various types of architectures.

The analysis server includes a first database 130 including common vulnerabilities and exposures (CVE) codes and a second database 140 including various types of information necessary for vulnerability analysis, such as a list of malicious Internet Protocol (IP) addresses, etc. In the present embodiment, for convenience of description, the first database 130 and the second database 140 are indicated separately according to the types of information stored, but this is only an example, and the first database 130 and the second database 140 may be implemented as one database.

Figure 2:
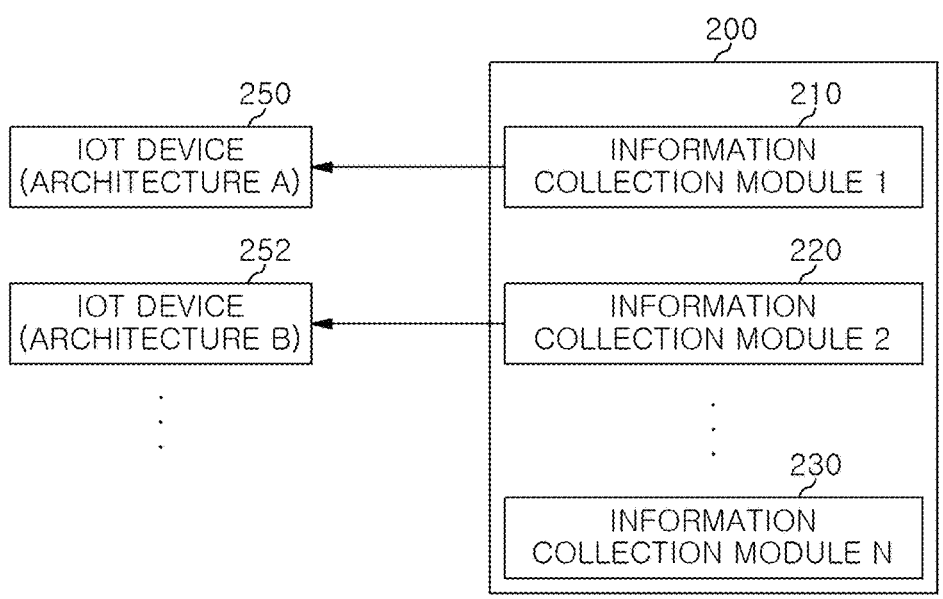
FIG. 2 is a diagram illustrating an example of information collection modules according to an embodiment of the present disclosure.

FIG. 2 is a diagram illustrating an example of information collection modules according to an embodiment of the present disclosure.

Referring to FIG. 2, the analysis server 120 includes a plurality of information collection modules 210, 220, and 230 for a plurality of different types of IoT architectures. For example, the analysis server 120 may include a plurality of information collection modules 210, 220, and 230 running on different types of operating systems. Here, the information collection modules 210, 220, and 230 are independent programs that collect information necessary for inspection of IoT devices.

When a first IoT device 250 is configured with architecture A, the analysis server 120 may transmit a first information collection module 210 operating in architecture A to the first IoT device 250, and when a second IoT device 252 is configured with architecture B, the analysis server 120 may transmit a second information collection module 220 operating in architecture B to the second IoT device 252. When an IoT device with a new architecture is present, the analysis server 120 may add a new information collection module appropriate for the IoT device to a group 200.

The analysis server 120 may include a platform web service including a screen interface through which the IoT device manufacturer or user (hereinafter, collectively referred to as a "user") can input information on the architecture of the IoT device so that the information collection module appropriate for the IoT device to be inspected can be downloaded.

Figure 3:
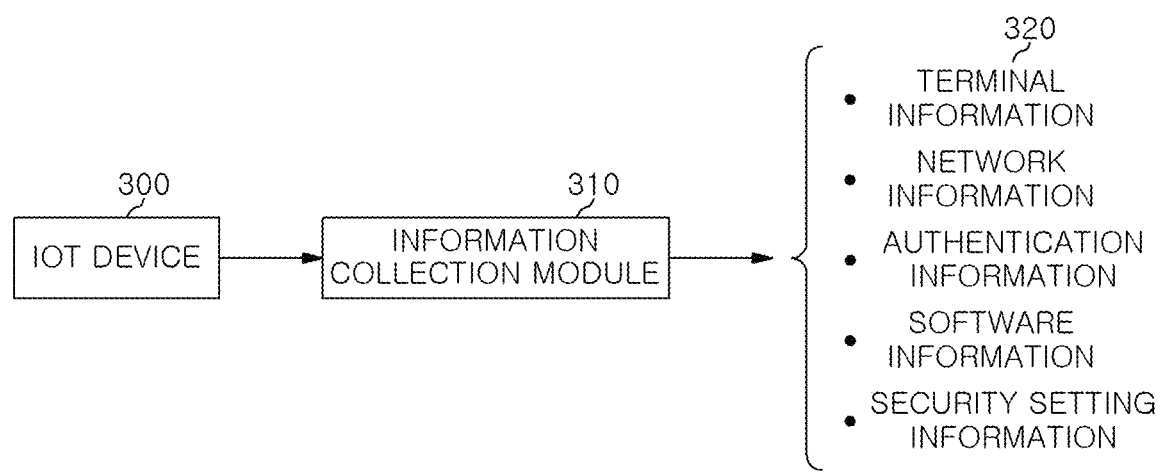
FIG. 3 is a diagram illustrating an example of status information of an IoT device that is collected by an information collection module according to an embodiment of the present disclosure.

FIG. 3 is a diagram illustrating an example of status information of an IoT device that is collected by an information collection module according to an embodiment of the present disclosure. FIGS. 4 to 12 are diagrams showing examples of status information collected by an information collection module from an IoT device implemented with a Linux operating system. Hereinafter, description will be made with reference to FIGS. 3 and 4 to 12 together.

First, referring to FIG. 3, an information collection module 310 is downloaded to an IoT device 300 to be inspected and operates on the IoT device 300. The information collection module 310 collects status information 320, such as terminal information, network information, authentication information, software information, security setting information, and the like of the IoT device, from the IoT device 300. The present embodiment is only an example to aid understanding of the present disclosure, and the types of status information 320 collected by the information collection module may be variously modified, added, or deleted depending on the embodiment.

The terminal information may include a version of the operating system of the IoT device, a list of processes (or services) running on the IoT device, etc. For example, when the IoT device is implemented with Linux, the information collection module 310 may identify information on the version of the operating system as shown in FIG. 4 through the "uname" command, and identify the list of processes running on the IoT device as shown in FIG. 5 through the "ps" command. Of course, in addition, the information collection module may be implemented to identify the version of the operating system of the IoT device or the list of processes through various conventional methods.

The network information may include a list of firewalls (e.g., firewall setting information and the like), network connection information (e.g., a list of connected IP addresses), service (or process) information (e.g., ftp, telnet, etc.) of a port in use, etc. For example, when the IoT device is implemented with Linux, the information collection module may identify the firewall setting information (e.g., the allowed IP address range or the access-blocked IP address range, etc.) of the IoT device as shown in FIG. 6 through the "iptables" command, identify the network connection information as shown in FIG. 7 through the "ifconfig" command, and identify the service (or process) information of the port in use as shown in FIG. 8 through the "netstat" command.

The authentication information may include account information (e.g., passwd and shadow files where account passwords are stored as a hash, etc.), certificate information, an encryption key, etc. For example, when the IoT device is implemented with Linux, the information collection module may collect the contents of the passwd and shadow files in a predefined directory, as shown in FIG. 9. For example, when the IoT device is implemented with Linux, the information collection module may identify and extract a Secure Shell Protocol (SSH) key, Secure Sockets Layer (SSL) certificate (*.cer, *.crt, *.csr, and *.pem), or the like stored in the IoT device through the filename extension, as shown in FIG. 10.

The software information includes a list or versions of software, versions of libraries, information on functions or versions, etc. For example, when the IoT device is implemented with Linux, the information collection module may identify, through the "ls" or "find" command in a predefined directory, a list of software or libraries stored in the corresponding directory, as shown in FIG. 11, and identify information on functions or versions being used through the "strings" or "grep" command.

The security setting information may include logging information and the like. For example, when the IoT device is implemented with Linux, the information collection module may collect log files stored in a specific directory (e.g., /var/log) in which logging information is stored, as shown in FIG. 12. Information on various types of directories in which information that should be collected by the information collection module are stored may be preset in the information collection module for each architecture.

Figure 13:
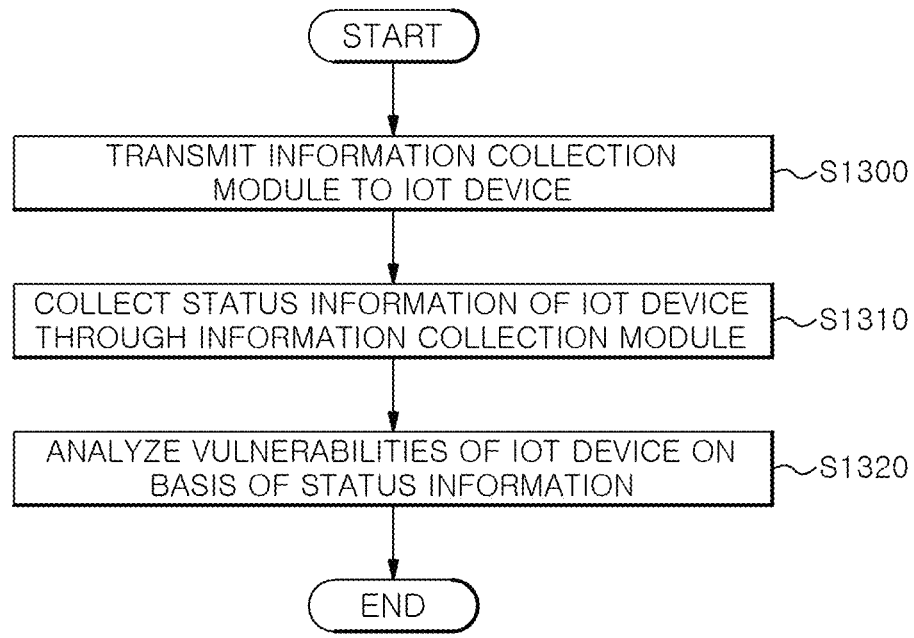
FIG. 13 is a flowchart illustrating an example of a method of inspecting an IoT device according to an embodiment of the present disclosure.

FIG. 13 is a flowchart illustrating an example of a method of inspecting an IoT device according to an embodiment of the present disclosure.

Referring to FIG. 13, an analysis server 120 transmits an information collection module appropriate for an architecture of an IoT device to the IoT device (S1300). For example, when the analysis server 120 receives architecture information such as a version of an operating system of the IoT device and the like from the IoT device, the analysis server 120 may find an information collection module appropriate for the architecture information and transmit the information collection module to the IoT device. As another embodiment, the analysis server 120 may provide a screen interface through which the architecture information of the IoT device can be input. The user may access the analysis server through a terminal (e.g., an IoT device, a general computer, etc.), input the architecture information of the IoT device to be inspected, and then download an information collection module appropriate for the corresponding architecture to install the downloaded information collection module on the IoT device. In the case, the user may access the analysis server 120 through a process such as logging in or the like.

The analysis server 120 collects status information of the IoT device through the information collection module (S1310). For example, the information collection module is installed and operated in the IoT device and collects the status information of the IoT device as illustrated in FIG. 3. As an embodiment, when the status information of the IoT device is collected, the information collection module may be automatically connected to the analysis server using a predefined IP address of the analysis server and then transmit the collected status information of the IoT device. As another embodiment, when the status information of the IoT device is collected, the information collection module may output the collected status information of the IoT device as a file or the like, and the user may directly access the analysis server 120 through a terminal (e.g., an IoT device or a general computer, etc.) to upload at least one file including the status information to the analysis server 120.

The analysis server 120 analyzes the vulnerabilities of the IoT device on the basis of the status information of the IoT device (S1320). The analysis server may provide analysis results of the vulnerabilities to the user, or store the analysis results in a second database or the like. For example, the analysis server 120 may provide analysis results including the type of IoT device to be inspected, the type of firmware or version information of the IoT device, a list of vulnerable domains and IPs of the IoT device, a list of backdoors and malicious software, etc., or store the analysis results in the second database.

The types of analysis of the vulnerabilities of the IoT device may be implemented in various ways depending on the embodiment. For example, the analysis server 120 may perform at least one of CVE vulnerability analysis, software vulnerability analysis, network vulnerability analysis, account vulnerability analysis, certificate vulnerability analysis, and log vulnerability analysis. Examples of various methods of vulnerability analysis are shown in FIGS. 14 to 19.

Figure 14:
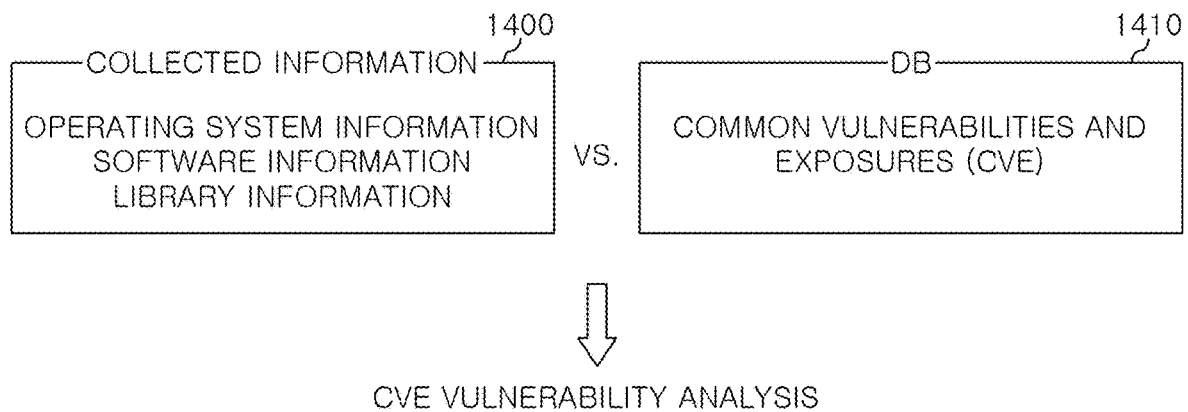
FIG. 14-19 are diagrams showing various examples of vulnerability analysis methods according to an embodiment of the present disclosure, where.

FIG. 14 is a diagram showing an example of a CVE vulnerability analysis method according to an embodiment of the present disclosure.

Referring to FIG. 14, the analysis server 120 may search a first database 1410 including the CVE codes on the basis of collected information 1400 including operating system information (e.g., name, version information, or the like of the operating system), software information (e.g., name, version information, or the like of software), or library information (e.g., name, version information, or the like of library) of the IoT device to identify and provide the contents (e.g., CVE-2016-2148—Heap Oveflow vulnerability occurs in Bysybox version 1.25.0 or lower) of the CVE code for the vulnerability of the IoT device. In order to analyze the CVE vulnerability, the information collection module may be implemented to include a function for collecting the operating system information, the software information, or the library information.

Figure 15:
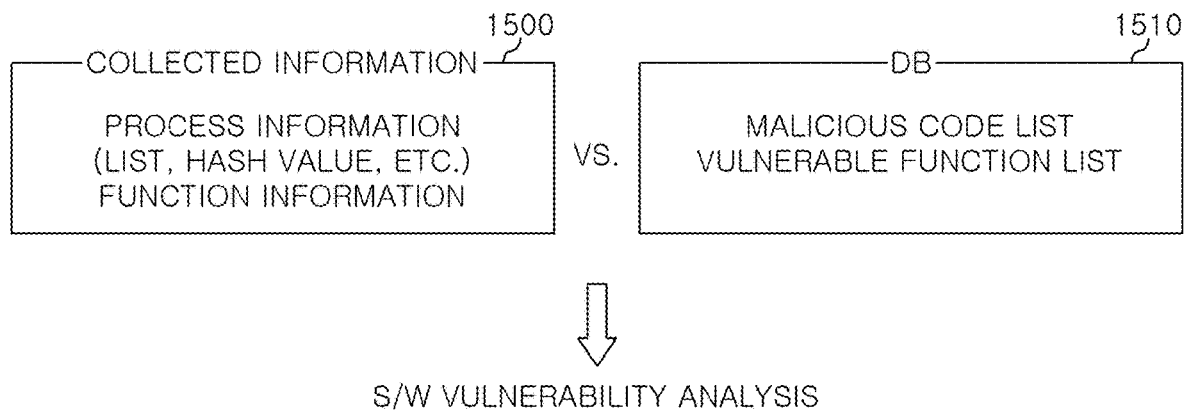

FIG. 15 is a diagram showing an example of a software vulnerability analysis method according to an embodiment of the present disclosure.

Referring to FIG. 15, the analysis server 120 searches a list of malicious code or list of vulnerable functions stored in a second database 1510 on the basis of collected information 1500 including a list or hash values of processes, function information, or the like of the IoT device to analyze vulnerabilities, and provides a list of vulnerable processes or functions of the IoT device.

The list of malicious code may include a list of various types of malicious code such as backdoors, malware, etc., and may include a hash value of the binary code of the malicious code. When there is malicious code whose name has been changed among a list of processes running on the IoT device, there may be limitations in identifying the malicious code only by comparing the names in the list of malicious code. Therefore, the analysis server 120 may compare a hash value of binary code of the process running on the IoT device with a hash value of the malicious code present in the list of malicious code to determine whether the hash values are identical, and detect the malicious code even when the names have been changed.

The list of vulnerable functions includes a list of functions vulnerable to hacking and the like. The analysis server 120 may compare a list of functions collected from the IoT device with the list of vulnerable functions to identify whether the vulnerable function is present. The analysis server 120 obtains the vulnerable function list including the present vulnerable function.

Figure 16:
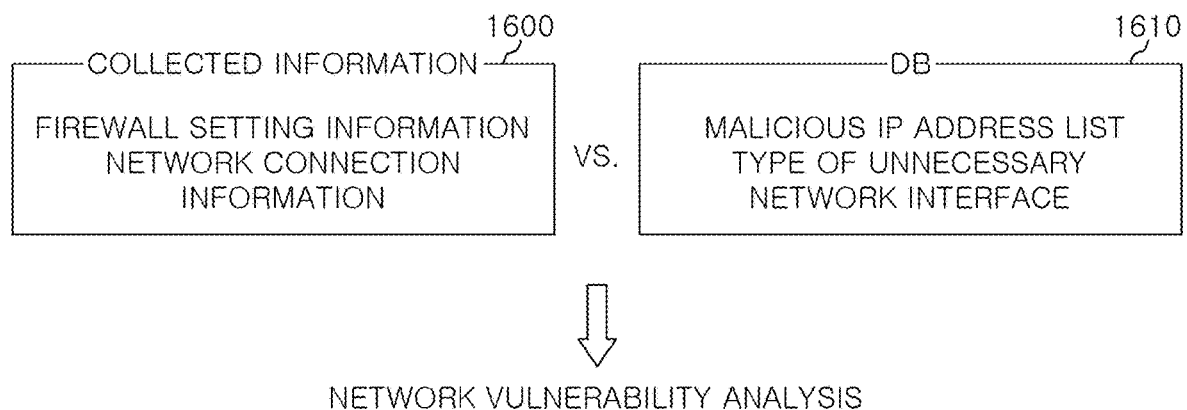

FIG. 16 is a diagram showing an example of a network vulnerability analysis method according to an embodiment of the present disclosure.

Referring to FIG. 16, the analysis server 120 searches a second database 1610 for a list of malicious IP addresses or types of unnecessary network interfaces on the basis of collected information 1600 including firewall setting information or network connection information of the IoT device to analyze network vulnerability, and provides the analyzed network vulnerability.

For example, the analysis server 120 may provide the list of malicious IP addresses when the list of malicious IP addresses of the second database is included in a range of IP addresses that allow access in the firewall setting information.

As another example, the analysis server 120 may predefine and store services (e.g., ftp, telnet, upnp, snmp, etc.) of ports that are unnecessary for the IoT device in the second database 1610, and then, when the services of the unnecessary ports are present in the IoT device, the analysis server 120 may provide the types of services of the unnecessary ports as analysis results on the basis of the second database 1610.

In one embodiment, the analysis server 120 is configured to collect of the status information of firewall setting information set in the IoT device 100 or connection information on a network connected to the IoT device 100. The analysis server 120 searches the second database 140 based on the firewall setting information or the network connection information to check whether the list of blocked internet addresses included in the firewall setting information includes malicious internet addresses already stored in the second database 140. The analysis server 120 is configured to identify vulnerabilities in the network connection, including the possibility of connection to a malicious Internet address, based on whether the firewall setting information includes a malicious internet address already stored in the second database 140, identify vulnerabilities in the network connection of the IoT devices 100, and/or search for the type of unnecessary network interface in the database based on the collected network connection information to identify the type of unnecessary network interface among the network interfaces existing in the IoT device 100 when network connection information is collected.

Figure 17:
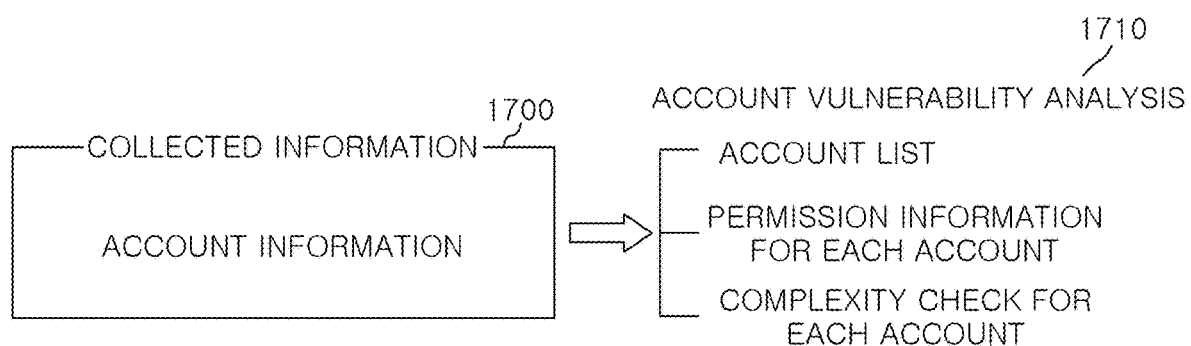

FIG. 17 is a diagram showing an example of an account vulnerability analysis method according to an embodiment of the present disclosure.

Referring to FIG. 17, the analysis server 120 may analyze account vulnerabilities 1710 on the basis of account information 1700 of the IoT device and provide a result of the analysis. For example, the analysis server 120 may organize and provide a list of accounts accessing the IoT device or a list of permission information for each account, or provide a result of analyzing the complexity for each account through a conventional complexity analysis program (e.g., password crack or the like).

Figure 18:
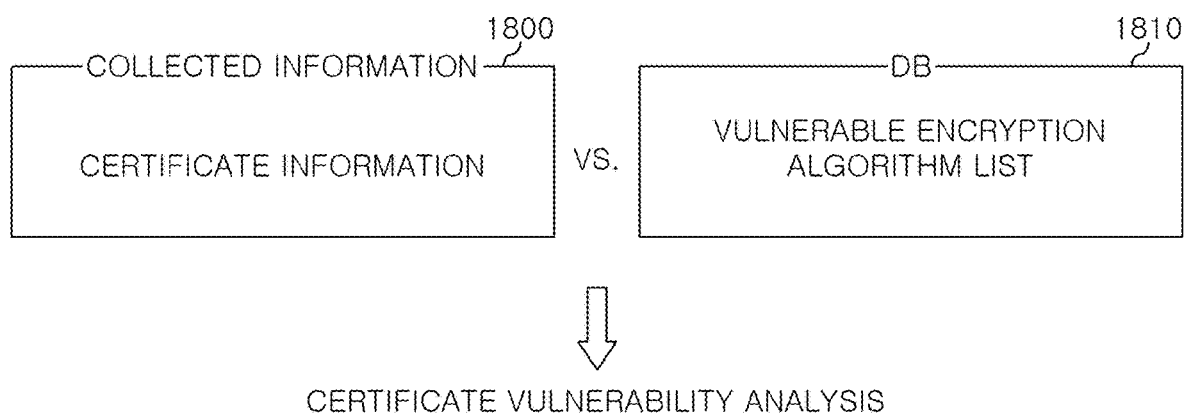

FIG. 18 is a diagram showing an example of a certificate vulnerability analysis method according to an embodiment of the present disclosure.

Referring to FIG. 18, the analysis server 120 may search a list of vulnerable encryption algorithms stored in a second database 1810 on the basis of certificate information 1800 of the IoT device, determine whether an encryption algorithm used in the certificate of the IoT device is a vulnerable encryption algorithm, and provide a result of the determination. For example, the analysis server 120 may collect certificate files that are present in the IoT device, then identify the encryption algorithm used through the certificate files, and determine whether the encryption algorithm corresponds to a vulnerable encryption algorithm.

Figure 19:
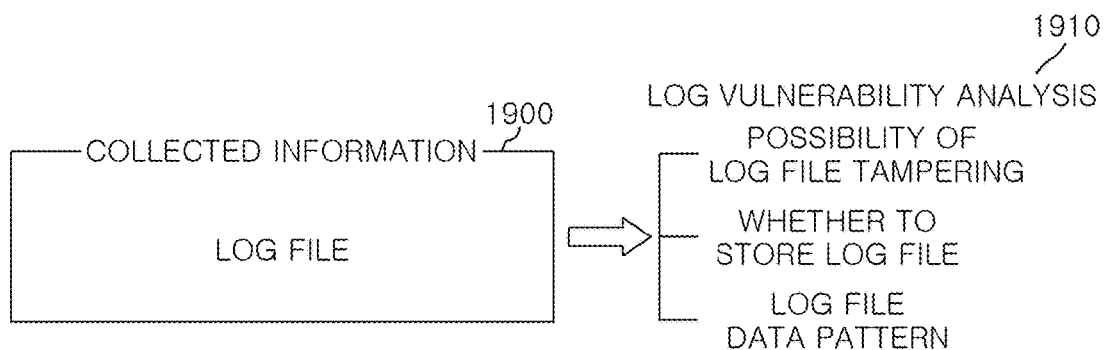

FIG. 19 is a diagram showing an example of a log vulnerability analysis method according to an embodiment of the present disclosure.

Referring to FIG. 19, the analysis server 120 may analyze the possibility of log file tampering, whether to store log files, log file data patterns, etc. 1910 on the basis of a log file 1900 of the IoT device and provide a result of the analysis. For example, the analysis server 120 may determine that there is a possibility of tampering with the log file when writing permission is granted to the log file of the IoT device. As another example, the analysis server 120 may check whether the log file is present in a specific directory according to the architecture of the IoT device to determine whether the log file is stored normally, or may identify a data structure (i.e., the type of data to be stored and the like) of the log file to determine whether the log file satisfies a log level appropriate for the IoT device. The specific directory in which the log file is stored, the format of the data structure according to the log level, or the like may be predefined in the information collection module.

FIG. 20 is a diagram showing an example of a method of changing the type of vulnerability analysis according to an embodiment of the present disclosure.

Referring to FIG. 20, the analysis server 120 includes a vulnerability analysis module 2000 for analyzing various vulnerabilities of IoT devices. For example, the analysis server 120 may include a CVE vulnerability analysis module, a software vulnerability analysis module, etc. However, the analysis server 120 does not provide such vulnerability analysis modules for each architecture of the IoT devices, but includes a common analysis module for various architectures.

The information collection module 200 collects of the status information of firewall setting information set in the IoT device 100 or connection information on a network connected to the IoT device 100.

The vulnerability analysis module 2000 searches the second database based on the firewall setting information or the network connection information to check whether the list of blocked internet addresses included in the firewall setting information includes malicious internet addresses already stored in the second database 140. And the vulnerability analysis module 2000 is configured to identify vulnerabilities in the network connection, including the possibility of connection to a malicious Internet address, based on whether the firewall setting information includes a malicious internet address already stored in the second database 140, identify vulnerabilities in the network connection of the IoT devices 100, and/or search for the type of unnecessary network interface in the database based on the collected network connection information to identify the type of unnecessary network interface among the network interfaces existing in the IoT device 100 when network connection information is collected.

For example, vulnerabilities are analyzed for IoT status information collected from an IoT device of a first architecture and IoT status information collected from an IoT device of a second architecture through the same vulnerability analysis module 2000. To this end, the analysis server 120 may define IoT status information collected by a plurality of information collection modules applied to different IoT architectures in the same format. As an embodiment, all the plurality of information collection modules may be implemented to output the IoT status information in the same format, or the analysis server 120 may be implemented to include a module that converts the IoT status information collected by the plurality of information collection modules into a predefined format. Various conventional methods of converting different data formats into the same data format may be applied to the present embodiment.

In the present embodiment, since the common vulnerability analysis module 2000 is used, in order to perform a new vulnerability analysis or delete or change the existing vulnerability analysis, the common vulnerability analysis module 2000 may be added, deleted, or changed, and the type of information collected by the information collection module for each architecture may be changed. That is, by modifying the information collection module, which is a small program with a collection function, it may be implemented to perform analysis of various vulnerabilities on IoT devices of various architectures. The system for inspecting an IoT device modify the information collection module that is a smaller program compared to the vulnerability analysis module to change the type of information collected by the information collection module for each architecture if a new vulnerability analysis is needed or if the pre-implemented vulnerability analysis that can be performed is deleted or changed.

Meanwhile, each embodiment of the present disclosure may also be implemented as computer readable code on a computer-readable recording medium. The computer-readable recording medium includes any type of recording device in which data that can be read by a computer system is stored. Examples of the computer-readable recording medium include a read-only memory (ROM), a random access memory (RAM), a compact disc ROM (CD-ROM), a solid-state drive (SSD), a flash memory, an optical data storage device, and the like. In addition, computer-readable recording media may be distributed in computer systems connected through a network and stored and executed as code that can be read in a distributed manner.

While the present disclosure has been particularly described with reference to exemplary embodiments, it will be understood by those skilled in the art that various changes may be made without departing from the spirit and scope of the present disclosure. Therefore, the disclosed embodiments should be considered in a descriptive sense only and not for purposes of limitation. The scope of the present disclosure is indicated in the claims rather than the foregoing description, and all differences within the scope equivalent thereto should be construed as being included in the present disclosure.

What is claimed is:

1. A method of inspecting an Internet of things (IoT) device, comprising:
   connecting with a plurality of IoT devices, wherein software architecture information or hardware architecture information of each of the plurality of IoT devices is obtained in the connecting process;
transmitting an information collection module to each of the plurality of IoT devices, respectively, wherein the transmitted information collection module corresponds to the software architecture information or the hardware architecture information of each connected IoT device, status information including terminal information, network information, authentication information, software information;
collecting the status information of each of the plurality of IoT devices through the information collection module;
searching a database including information related to vulnerabilities based on the collected status information through a vulnerability analysis module to analyze vulnerabilities of each of the plurality of IoT devices; and
modifying the information collection module that includes a smaller program, compared to the vulnerability analysis module, in order to change a type of information collected by the information collection module for the software architecture information or the hardware architecture information, when a new vulnerability analysis is needed or when a vulnerability analysis that has been pre-implemented is deleted or changed, and
wherein:
the database includes a first database including a list of malicious Internet addresses for blocking connection between the plurality of IoT devices and a corresponding internet address or types of network interfaces unnecessary for the plurality of IoT devices,
the collecting status information of each of the plurality of IoT devices includes collecting status information of firewall setting information, set in each of the plurality of IoT devices or connection information on a network connected to each of the plurality of IoT devices, and
the analyzing of the vulnerabilities of each of the plurality of IoT devices includes:
searching the first database based on the firewall setting information or the network connection information to check whether the list of blocked internet addresses included in the firewall setting information includes malicious internet addresses already stored in the first database;
identifying vulnerabilities in the network connection, including a possibility of connection to the malicious Internet address, based on whether the firewall setting information includes the malicious internet address already stored in the first database; and
when network connection information is collected, searching for a type of unnecessary network interface in the database based on the collected network connection information to identify the type of unnecessary network interface among the network interfaces present in each of the plurality of IoT devices.

2. The method of claim 1, wherein the database includes a second database including common vulnerabilities and exposures (CVE) codes,
the collecting of the status information of the plurality of IoT devices includes identifying operating system information including a version of an operating system installed on the IoT device, software information including a list or version of software installed on the IoT device, or library information including a list or version of libraries installed on the IoT device through the information collection module, and
the analyzing of the vulnerabilities of each of the plurality of IoT device includes identifying CVE vulnerabilities for an operating system, software, or libraries by searching the second database on the basis of the operating system information, the software information, or the library information.

3. The method of claim 1, wherein the database includes a third database including a list of malicious code or a list of vulnerable functions including names of the malicious code or hash values of the malicious code,
the collecting of the status information of each of the plurality of IoT devices includes collecting a list of processes running on each of the plurality of IoT devices, hash values of the processes, or a list of functions, and
the analyzing of the vulnerabilities of each of the plurality of IoT devices includes determining whether the processes or the functions are present in the list of malicious code or the list of vulnerable functions.

4. The method of claim 1, wherein the collecting of the status information of each of the plurality of IoT devices includes collecting account information or certificate information stored in each of the plurality of IoT devices, and
the analyzing of the vulnerabilities of each of the plurality of IoT devices includes cracking a password stored as a hash value in account information to check a complexity of the password or determining whether an encryption algorithm of a certificate identified based on certificate information is a predefined vulnerable encryption algorithm.

5. The method of claim 1, wherein the collecting of the status information of each of the plurality of IoT devices includes collecting log files of each of the plurality of IoT devices, and
the analyzing of the vulnerabilities of each of the plurality of IT devices includes analyzing vulnerabilities of log files on the basis of access rights to the log files, a presence or absence of the log files, and a data pattern of the log files.

6. A system for inspecting an Internet of things (IoT) device, comprising:
a database including a first memory storing information on vulnerabilities, wherein the database includes a first database including a list of malicious Internet addresses for blocking connection between an IoT device and a corresponding internet address or types of network interfaces unnecessary for the IoT device; and
an analysis server comprising a processor and a second memory storing instructions executable by the processor,
wherein the analysis server is configured to:
connect with a plurality of IoT devices, wherein software architecture information or hardware architecture information of each of the plurality of IoT devices is obtained in the connecting;
transmit an information collection module to each of the plurality of IoT devices, respectively, wherein the transmitted information collection module corresponds to the software architecture information or the hardware architecture information of each connected IoT device, status information including terminal information, network information, authentication information, software information;
collect the status information of each of the plurality of IoT devices through the information collection module;
search a database including information related to vulnerabilities based on the collected status information through a vulnerability analysis module to analyze vulnerabilities of each of the plurality of IoT devices; and modify the information collection module that includes a smaller program, compared to the vulnerability analysis module, in order to change a type of information collected by the information collection module for the software architecture information or the hardware architecture information, when a new vulnerability analysis is needed or when a vulnerability analysis that has been pre-implemented is deleted or changed, and wherein the analysis server, for collecting status information of the plurality of IoT devices through the information collection module, is configured to:

collect the status information of firewall setting information, set in each of the plurality of IoT devices or connection information on a network connected to each of the plurality of IoT devices, and wherein the analysis server, for analyzing of the vulnerability of the plurality of IoT devices, is further configured to:

search the first databased based on the firewall setting information or the network connection information to check whether the list of blocked internet addresses included in the firewall setting information includes malicious internet addresses already stored in the first database and identify vulnerabilities in the network connection, including possibility of connection to a malicious Internet address, based on whether the firewall setting information includes a malicious internet address already stored in the first database, wherein the analysis server, for analyzing of the vulnerability of the plurality of IoT devices, is further configured to:

identify vulnerabilities in the network connection, including the possibility of connection to the malicious Internet address, based on whether the firewall setting information includes a malicious internet address already stored in the first database, and search for a type of unnecessary network interface in the first database based on the collected network connection information to identify the type of unnecessary network interface among the network interfaces present in the plurality of IoT devices when the network connection information is collected.

7. A non-transitory, computer-readable recording medium on which a computer program for performing the method according to claim 1 is recorded.

* * * * *